US012786417B2

(12) United States Patent
Bordes et al.

(10) Patent No.: US 12,786,417 B2
(45) Date of Patent: Nov. 3, 2026

(54) ESTIMATING WEIGHTED-PREDICTION PARAMETERS

(71) Applicant: InterDigital CE Patent Holdings, SAS, Paris (FR)

(72) Inventors: Philippe Bordes, Laille (FR); Tangi Poirier, Thorigné-Fouillard (FR); Fabrice Leleannec, Betton (FR); Philippe De Lagrange, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 19 days.

(21) Appl. No.: 18/892,053

(22) Filed: Sep. 20, 2024

(65) Prior Publication Data

US 2025/0016328 A1 Jan. 9, 2025

Related U.S. Application Data

(63) Continuation of application No. 17/787,533, filed as application No. PCT/EP2020/085446 on Dec. 10, 2020, now Pat. No. 12,137,228.

(30) Foreign Application Priority Data

Dec. 26, 2019 (EP) .................................... 19306775

(51) Int. Cl.
*H04N 19/137* (2014.01)
*H04N 19/105* (2014.01)
(Continued)

(52) U.S. Cl.
CPC ......... *H04N 19/139* (2014.11); *H04N 19/105* (2014.11); *H04N 19/132* (2014.11); *H04N 19/176* (2014.11)

(58) Field of Classification Search
CPC .. H04N 19/139; H04N 19/105; H04N 19/132; H04N 19/176; H04N 19/136;
(Continued)

(56) References Cited

U.S. PATENT DOCUMENTS

2009/0010330 A1 1/2009 Tourapis et al.
2014/0321551 A1 10/2014 Ye et al.
(Continued)

FOREIGN PATENT DOCUMENTS

CN 105706447 A 6/2016
CN 109688411 A 4/2019

OTHER PUBLICATIONS

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.
(Continued)

*Primary Examiner* — Hesham K Abouzahra
(74) *Attorney, Agent, or Firm* — Condo Roccia Koptiw LLP

(57) ABSTRACT

Described are methods and apparatus for estimating weighted prediction parameters intended to be used for predicting an image block. A component of an image block of a video may be precited from a set of options that includes a first version of weighted prediction parameters, a refined version of the weighted prediction parameters, or no weighted prediction parameters, and the image block may be encoded.

20 Claims, 6 Drawing Sheets

(51) Int. Cl.
*H04N 19/132* (2014.01)
*H04N 19/139* (2014.01)
*H04N 19/176* (2014.01)

(58) Field of Classification Search
CPC .. H04N 19/186; H04N 19/573; H04N 19/577; H04N 19/147
See application file for complete search history.

(56) References Cited

U.S. PATENT DOCUMENTS

2015/0195524 A1* 7/2015 Li .......................... H04N 19/46 375/240.02
2016/0127727 A1 5/2016 Yoshino et al.
2017/0180734 A1 6/2017 Su et al.

OTHER PUBLICATIONS

Bordes, et al., "Weighted Prediction for HEVC", Proceedings SPIE, vol. 8305, Visual information Processing and Communication III, IS&T/SPIE Electronic Imaging, Burlingame, California, USA, Feb. 15, 2012, 6 pages.
Bross, et al., "Versatile Video Coding (Draft 7)", JVET-P2001-vE, Editors, Joint Video Experts Team (JVET) of ITU-T SG 16 WP 3 and ISO/IEC JTC 1/SC 29/WG 11, 16th Meeting: Geneva, CH, Oct. 1-11, 2019, 492 pages.
Chen, et al., "Algorithm Description for Versatile Video Coding and Test Model 7 (VTM 7)", JVET-P2002-V1, Editors, Joint Video Experts Team (JVET) of ITU-T SG 16 WP 3 and ISO/IEC JTC 1/SC 29/WG11, 16th Meeting: Geneva, CH, Oct. 1-11, 2019, pp. 1-90.
ITU-T, "Series H: Audiovisual and Multimedia Systems, Infrastructure of Audiovisual Services—Coding of Moving Video—Information Technology—Generic Coding of Moving Pictures and Associated Audio Information: Video", Recommendation ITU-T H.262, International Telecommunication Union, ITU-T Telecommunication Standardization Sector of ITU, Feb. 2000, 220 pages.
ITU-T, "Transmission of Non-Telephone Signals: Information Technology—Generic Coding of Moving Pictures and Associated Audio Information: Systems", Recommendation ITU-T H.222.0, International Telecommunication Union, ITU-T Telecommunication Standardization Sector of ITU, Jul. 1995, 135 pages.

* cited by examiner

ESTIMATING WEIGHTED-PREDICTION PARAMETERS

CROSS REFERENCE TO RELATED APPLICATIONS

This application is a continuation of U.S. patent application Ser. No. 17/787,533 (now U.S. Pat. No. 12,137,228), which is the National Stage Entry under 35 U.S.C. § 371 of Patent Cooperation Treaty Application No. PCT/EP2020/085446, filed Dec. 10, 2020, which claims priority from European Patent Application No. 19306775.8, filed Dec. 26, 2019, the disclosures of each of which are incorporated by reference herein in their entireties.

TECHNICAL FIELD

The domain technical field of the one or more embodiments is generally related to video compression. In particular, at least some embodiments relate to estimating weighted-prediction parameters.

SUMMARY

At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (October 2014), series H: audiovisual and multimedia systems, infrastructure of audiovisual services-coding of moving video, High efficiency video coding, Recommendation ITU-T H.265"), or compared to under development video compression systems such VVC (Versatile Video Coding (Draft 7), B. Bross, J. Chen, S. Liu, Y-K. Wang, document JVET-P2001, Geneva, October 2019).

Video compression systems provide rules for compressing and encoding data relating to images of a sequence of images. These rules provide a way of compressing and encoding image data to transmit less data than the viewing camera originally provided about the images. This reduced volume of data then requires less channel bandwidth for transmission. A receiver can re-construct (or decode) the images of the sequence of images from the transmitted data if it knows the rules that the transmitter used to perform the compression and encoding.

Video compression systems encode an image block using either an inter or intra or combined inter-intra prediction mode. For inter prediction mode, motion estimation/compensation is used to predict an image block from a reference image. A prediction block may be obtained, for example, by searching the best matching image block in a reference image in a predetermined search window according to a predetermined matching error criterion. Then, the matched image block may be an inter prediction block used to predict the original image block, and a prediction residual block is further processed and transmitted to the decoder. The relative shifts in the horizontal and vertical directions of the reference image block with respect to the original image block are grouped and referred to as a motion vector of the original image block, which is also transmitted to the decoder.

For intra prediction mode, an image block in an image is predicted using spatial prediction methods. An intra prediction block may be obtained, for example, by searching the best matching image block in the image in a predetermined search window according to a predetermined matching error criterion. Then, the matched image block may be an intra prediction block used to predict the original image block, and a prediction residual block is further processed and transmitted to the decoder.

The main aim of intra and inter prediction is to predict an image block such that a prediction residual block obtained from taking a difference of the prediction and original image blocks produces the lowest number of bits in encoding.

One of the challenges is to improve the prediction of an image block to reduce the dynamic of the prediction residual block.

This is addressed by the general aspects described herein, which are directed to estimating weighted prediction parameters.

According to a first aspect, there is provided a method for predicting an image block using weighted prediction parameters estimated by obtaining a first estimate of said weighted prediction parameters; obtaining a second estimate of said weighted prediction parameters based on a scaled reference image histogram derived from samples of the reference image and the first estimate of said weighted prediction parameters; and enabling the use of the second estimate of said weighted prediction parameters for predicting the image blocks based on an histogram distortion calculated between an image histogram, derived from samples of the image, and a reference image histogram, derived from samples of the reference image, and another histogram distortion calculated between the image histogram and a scaled reference image histogram derived from the reference image histogram and the second estimate of said weighted prediction parameters.

In one embodiment, obtaining the second estimate of the weighted prediction parameters depends on a configuration parameter.

In one embodiment, obtaining the second estimate of the weighted prediction parameters depends on a component of the image.

In a variant, obtaining a second estimate of said weighted prediction parameters and enabling the use of the second estimate of said weighted prediction parameters for predicting the image blocks are performed for a first component of the image. The method further comprises, for a second component of the image, enabling the use of the weighted prediction parameters for predicting the image blocks based on the first estimate of the weighted parameters and a sum of absolute differences between samples of the image and samples of the scaled reference image, and a sum of absolute differences between samples of the image and samples of reference image.

In a variant, the method further comprises spreading the image histogram before obtaining the first estimate of the weighted prediction parameters.

In one embodiment, spreading the image histogram depends on the bit-depth of samples of the image and a given bit-depth.

In one embodiment, spreading the image histogram comprises distributing the samples of the image relative to a peak of the image histogram around said peak.

In one embodiment, a first estimate of the weighted prediction parameters is obtained either from default weighted parameters or on the base of samples of the image and samples of a reference image.

According to other aspects, there are provided an apparatus, a non-transitory computer readable medium and a computer program product.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated. The drawings show.

DETAILED DESCRIPTION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
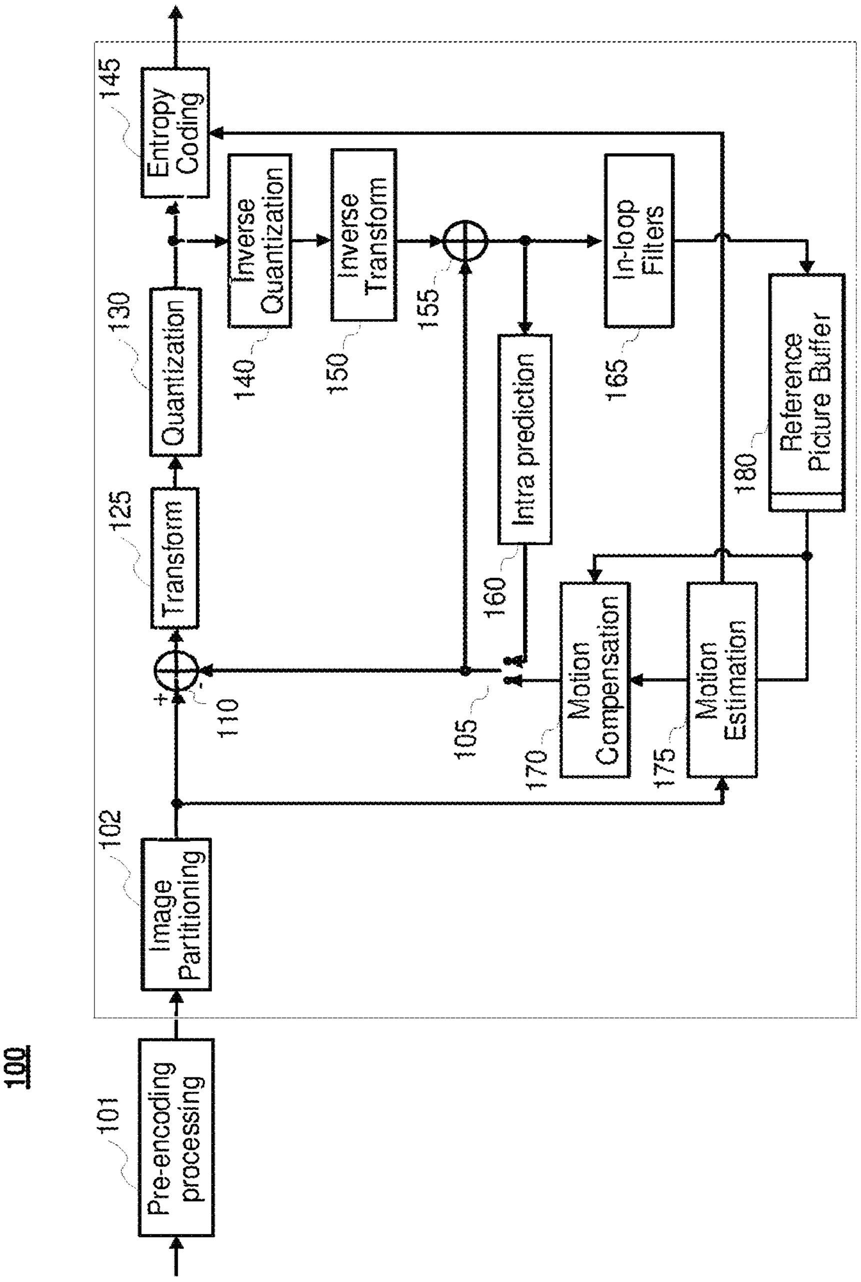
FIG. 1 illustrates a block diagram of an example of an encoder in which various aspects and embodiments are implemented.
Figure 2:
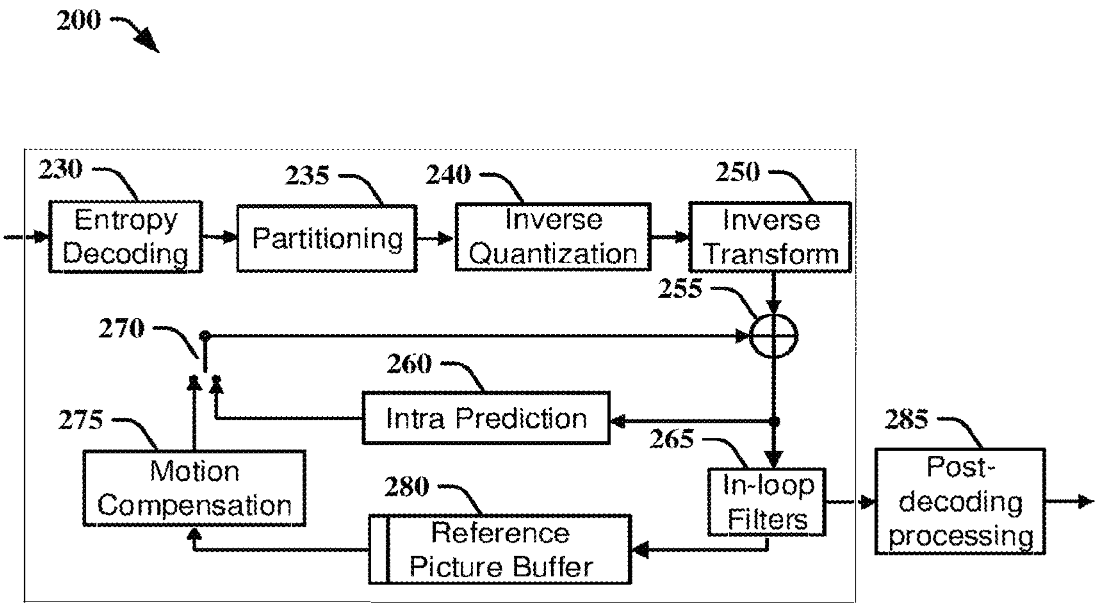
FIG. 2 illustrates a block diagram of a video decoder in which various aspects and embodiments are implemented.
Figure 3:
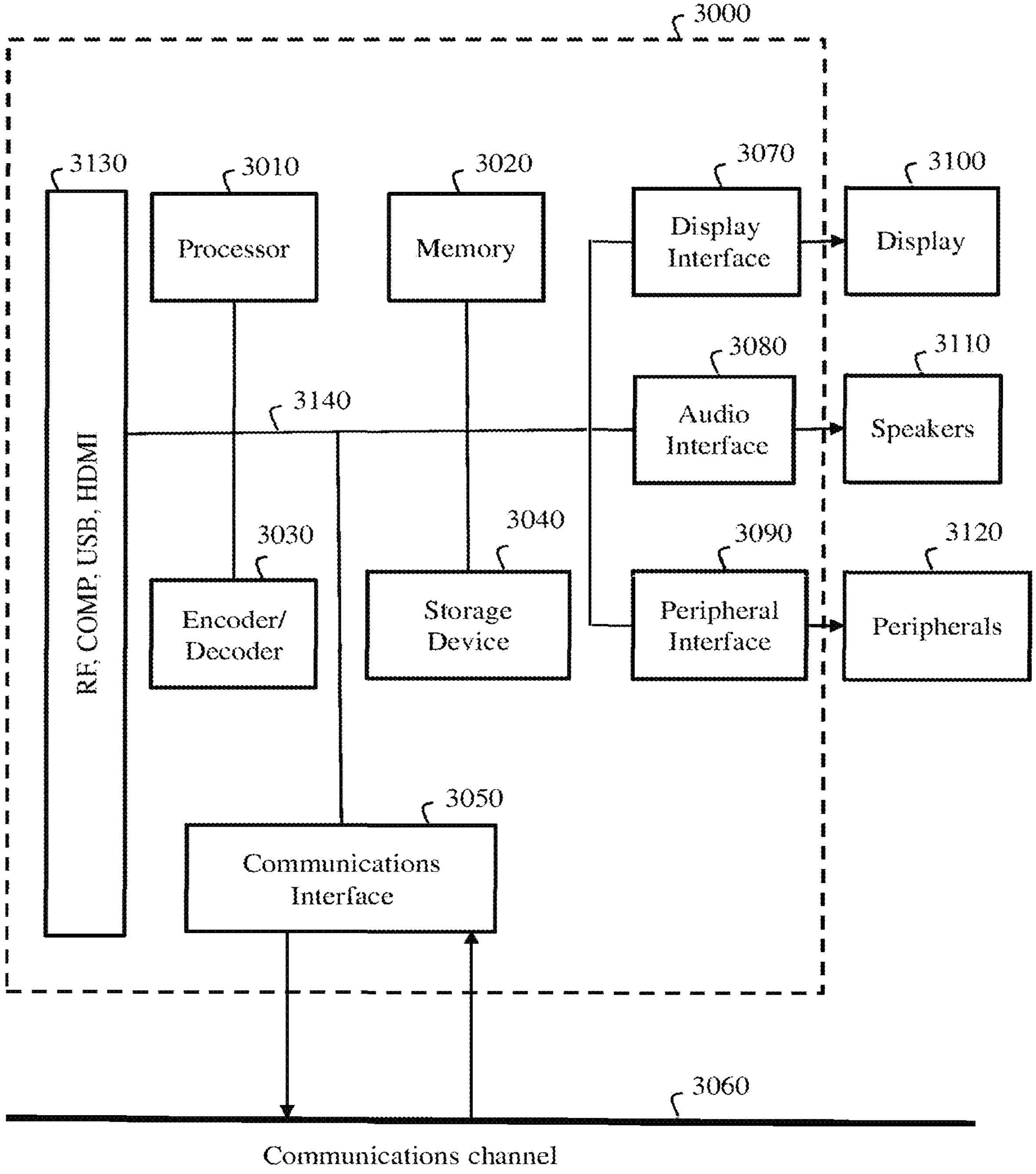
FIG. 3 illustrates a block diagram of an example of a system in which various aspects and embodiments are implemented.

The aspects described and contemplated in this application can be implemented in many different forms. FIGS. 1, 2 and 3 provide some embodiments, but other embodiments are contemplated and the discussion of FIGS. 1, 2 and 3 does not limit the breadth of the implementations.

At least one of the aspects generally relates to video encoding and decoding. These and other aspects can be implemented as a method, an apparatus, a computer readable medium having stored thereon instructions for encoding or decoding video data according to any of the above described methods, or a computer program product comprising instructions which, when the program is executed by a computer, cause the computer to carry out any of the above described method.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The term "histogram" refers to histogram or cumulative histogram of sample values.

The term 'histogram distortion" is also used. A "histogram distortion "HD" between two histograms H1 and H2 may be defined by the sum of absolute differences of the histogram values of H1 and H2 associated to each bin or the sum of squared differences of the histogram values of H1 and H2 associated to each bin "b".

$$HID = \sum_{b=0}^{N-1} |H_2(b) - H_1(b)|$$

The histogram associated to an image component is composed of N bins corresponding to the N possible values (a.k.a. range values) that the image samples may have for this component. For example, a 8-bits image is made of three components (ex: Y,U,V) with values between 0 and 255 (Y) or between −128 and 127 (U,V). The histogram value associated with bin "b" is the number of samples in the image that have value equal to "b" for this component. The cumulative histogram value associated with bin "b" is the number of samples in the image that have value inferior or equal to "b" for this component.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the module 102 of deriving coding parameter of a video encoder 100 of FIG. 1. Moreover, the present aspects are not limited to particular video compression systems such as VVC or HEVC, and can be applied, for example, to other standards and recommendations, whether pre-existing or future-developed, and extensions of any such standards and recommendations (including WVC and HEVC). Unless indicated otherwise, or technically precluded, the aspects described in this application can be used individually or in combination.

Various numeric values are used in the present application, for example, number of intra prediction mode. The specific values are for example purposes and the aspects described are not limited to these specific values.

FIG. 1 illustrates a block diagram of an encoder 100. Variations of this encoder 100 are contemplated, but the encoder 100 is described below for purposes of clarity without describing all expected variations.

Before being encoded, a video sequence may go through pre-encoding processing (101), for example, applying a color transform to the input color picture (e.g., conversion from RGB 4:4:4 to YCbCr 4:2:0), or performing a remapping of the input image components in order to get a signal distribution more resilient to compression (for instance using a histogram equalization of one of the color components). Metadata can be associated with the pre-encoding processing (101) and attached to the bitstream.

In the encoder 100, an image is encoded by the encoder elements as described below. The image to be encoded is partitioned (102) and processed in units of, for example, CUs (Coding Unit). Each unit (typically an image block) is encoded using, for example, either an inter or intra or combined inter-intra predicting mode. When a unit is encoded in an intra predicting mode, it performs intra prediction (160). In an inter predicting mode, motion estimation (175) and compensation (170) are performed. In a combined inter-intra predicting mode, it performs both an intra prediction (160) and motion estimation (175) and compensation (170). The encoder decides (105) which one of the intra predicting mode or inter predicting mode or combined inter-intra predicting mode to use for encoding the unit, and indicates the decision by, for example, a prediction mode flag. Prediction residuals are calculated, for example, by subtracting (110) the predicted unit from the original unit.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the prediction residual is coded directly without the application of the transform or quantization processes.

The encoder decodes an encoded unit to provide a reference for further predictions. The quantized transform coefficients are de-quantized (140) and inverse transformed (150) to decode prediction residuals. Combining (155) the decoded prediction residuals and the predicted unit, a unit is reconstructed. In-loop filters (165) are applied to the reconstructed unit to perform, for example, image de-blocking or SAO (Sample Adaptive Offset) filtering to reduce encoding artifacts. The filtered unit is stored at a reference picture buffer (a.k.a decoded picture buffer, DPB) (180).

FIG. 2 illustrates a block diagram of a video decoder 200. Variations of this decoder 200 are contemplated, but the decoder 200 is described below for purposes of clarity without describing all expected variations.

In the decoder 200, a bitstream is decoded by the decoder elements as described below.

Video decoder 200 generally performs a decoding pass reciprocal to the encoding pass as described in FIG. 2. The decoder 200 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the image according to the decoded picture partitioning information. The transform coefficients are de-quantized (240) and inverse transformed (250) to decode the prediction residuals. Combining (255) the decoded prediction residuals and the predicted unit, a unit (typically an image block) is reconstructed. The predicted unit can be obtained (270) from intra prediction (260) or motion-compensated prediction (i.e., inter prediction) (275) or both intra prediction (260) and motion-compensated prediction (i.e., inter prediction) (275). In-loop filters (265) are applied to the reconstructed unit. The filtered unit is stored at a reference picture buffer (280).

The decoded image can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 3000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 3000, singly or in combination, can be embodied in a single integrated circuit (IC), multiple ICs, and/or discrete components. For example, in at least one embodiment, the processing and encoder/decoder elements of system 3000 are distributed across multiple ICs and/or discrete components. In various embodiments, the system 3000 is communicatively coupled to one or more other systems, or other electronic devices, via, for example, a communications bus or through dedicated input and/or output ports. In various embodiments, the system 3000 is configured to implement one or more of the aspects described in this document.

The system 3000 includes at least one processor 3010 configured to execute instructions loaded therein for implementing, for example, the various aspects described in this document. Processor 3010 can include embedded memory, input output interface, and various other circuitries as known in the art. The system 3000 includes at least one memory 3020 (e.g., a volatile memory device, and/or a non-volatile memory device). System 3000 includes a storage device 3040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 3040 can include an internal storage device, an attached storage device (including detachable and non-detachable storage devices), and/or a network accessible storage device, as non-limiting examples.

System 3000 includes an encoder/decoder module 3030 configured, for example, to process data to provide an encoded video or decoded video, and the encoder/decoder module 3030 can include its own processor and memory. The encoder/decoder module 3030 represents module(s) that can be included in a device to perform the encoding and/or decoding functions. As is known, a device can include one or both of the encoding and decoding modules. Additionally, encoder/decoder module 3030 can be implemented as a separate element of system 3000 or can be incorporated within processor 3010 as a combination of hardware and software as known to those skilled in the art.

Program code to be loaded onto processor 3010 or encoder/decoder 3030 to perform the various aspects described in this document can be stored in storage device 340 and subsequently loaded onto memory 3020 for execution by processor 3010. In accordance with various embodiments, one or more of processor 3010, memory 3020, storage device 3040, and encoder/decoder module 3030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 3010 and/or the encoder/decoder module 3030 is used to store instructions and to provide working memory for processing that is needed during encoding or decoding.

In other embodiments, however, a memory external to the processing device (for example, the processing device can be either the processor 3010 or the encoder/decoder module 3030) is used for one or more of these functions. The external memory can be the memory 3020 and/or the storage device 3040, for example, a dynamic volatile memory and/or a non-volatile flash memory.

In several embodiments, an external non-volatile flash memory is used to store the operating system of, for example, a television.

In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 3000 can be provided through various input devices as indicated in module 3130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of module 3130 have associated respective input processing elements as known in the art. For example, the RF portion can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter.

In various embodiments, the RF portion includes an antenna.

Additionally, the USB and/or HDMI terminals can include respective interface processors for connecting system 3000 to other electronic devices across USB and/or HDMI connections.

It is to be understood that various aspects of input processing, for example, Reed-Solomon error correction, can be implemented, for example, within a separate input processing IC or within processor 3010 as necessary.

Similarly, aspects of USB or HDMI interface processing can be implemented within separate interface ICs or within processor 3010 as necessary.

The demodulated, error corrected, and demultiplexed stream is provided to various processing elements, including, for example, processor 3010, and encoder/decoder 3030 operating in combination with the memory and storage elements to process the data stream as necessary for presentation on an output device.

Various elements of system 3000 can be provided within an integrated housing. Within the integrated housing, the various elements can be interconnected and transmit data therebetween using suitable connection arrangement $12^2140$, for example, an internal bus as known in the art, including the Inter-IC (I2C) bus, wiring, and printed circuit boards.

The system 3000 includes communication interface 3050 that enables communication with other devices via communication channel 3060. The communication interface 3050 can include, but is not limited to, a transceiver configured to transmit and to receive data over communication channel 3060. The communication interface 3050 can include, but is not limited to, a modem or network card and the communication channel 3060 can be implemented, for example, within a wired and/or a wireless medium.

Data is streamed, or otherwise provided, to the system 3000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 3060 and the communications interface 3050 which are adapted for Wi-Fi communications. The communications channel 3060 of these embodiments is typically connected to an access point or router that provides access to external networks including the Internet for allowing streaming applications and other over-the-top communications.

Other embodiments provide streamed data to the system 3000 using a set-top box that delivers the data over the HDMI connection of the input image block 3130. Still other embodiments provide streamed data to the system 3000 using the RF connection of the input module 3130.

As indicated above, various embodiments provide data in a non-streaming manner.

Additionally, various embodiments use wireless networks other than Wi-Fi, for example a cellular network or a Bluetooth network.

The system 3000 can provide an output signal to various output devices, including a display 3100, speakers 3110, and other peripheral devices 3120.

The display 3100 of various embodiments includes one or more of, for example, a touchscreen display, an organic light-emitting diode (OLED) display, a curved display, and/or a foldable display. The display 3100 can be for a television, a tablet, a laptop, a cell phone (mobile phone), or other device. The display 3100 can also be integrated with other components (for example, as in a smart phone), or separate (for example, an external monitor for a laptop).

The other peripheral devices 3120 include, in various examples of embodiments, one or more of a stand-alone digital video disc (or digital versatile disc) (DVR, for both terms), a disk player, a stereo system, and/or a lighting system.

Various embodiments use one or more peripheral devices 3120 that provide a function based on the output of the system 3000. For example, a disk player performs the function of playing the output of the system 3000.

In various embodiments, control signals are communicated between the system 3000 and the display 3100, speakers 3110, or other peripheral devices 3120 using signaling such as AV.Link, Consumer Electronics Control (CEC), or other communications protocols that enable device-to-device control with or without user intervention.

The output devices can be communicatively coupled to system 3000 via dedicated connections through respective interfaces 3070, 3080, and 3090.

Alternatively, the output devices can be connected to system 3000 using the communications channel 3060 via the communications interface 3050.

The display 3100 and speakers 3110 can be integrated in a single unit with the other components of system 3000 in an electronic device such as, for example, a television.

In various embodiments, the display interface 3070 includes a display driver, such as, for example, a timing controller (T Con) chip.

The display 3100 and speaker 3110 can alternatively be separate from one or more of the other components, for example, if the RF portion of input 3130 is part of a separate set-top box.

In various embodiments in which the display 3100 and speakers 3110 are external components, the output signal can be provided via dedicated output connections, including, for example, HDMI ports, USB ports, or COMP outputs.

The embodiments can be carried out by computer software implemented by the processor 3010 or by hardware, or by a combination of hardware and software.

As a non-limiting example, the embodiments can be implemented by one or more integrated circuits.

The memory 3020 can be of any type appropriate to the technical environment and can be implemented using any appropriate data storage technology, such as optical memory devices, magnetic memory devices, semiconductor-based memory devices, fixed memory, and removable memory, as non-limiting examples.

The processor 3010 can be of any type appropriate to the technical environment, and can encompass one or more of microprocessors, general purpose computers, special purpose computers, and processors based on a multi-core architecture, as non-limiting examples.

In inter-prediction mode, an image block (cur) may be predicted from motion compensated samples of a reference block (ref) of a reference picture previously reconstructed (decoded) and stored in a decoded picture buffer (DPB). Next, the motion compensated samples (also denoted inter-prediction samples) may then be corrected with weighted prediction parameters (WP parameters) to compensate for illumination change between the samples of the image block cur and motion compensated samples of the reference block ref.

Weighted-Prediction (WP) as defined for example in HEVC or VVC, allows defining weights and offsets ($w_i$; $off_i$) per group of units, for example group of blocks, region, slice or whole picture, associated with a reference picture "i". Each group of blocks (ex: reference image) in the Decoded Pictures Buffer (DPB) is associated with weighted-prediction parameters. In the following, one will use the term image but it can be replaced with slice or region in an image, where a region is a group of blocs typically.

WP is then applied onto the inter-prediction samples.

WP may apply both for uni-directional prediction or bi-prediction.

For example, if the image block cur is coded in uni-directional with a reference block index $refIdx_0$, ($w_0$; $off_0$) may refer to the weight and offset associated with $refIdx_0$.

The weighted uni-directional prediction samples $Pred'_0$ and weighted bi-directional prediction samples $Pred'_{01}$ may then be given by:

$$Pred'_0 = ((w_0.Pred_0[x] + (1 \ll (\text{shift} - 1))) \gg \text{shift}) + \text{off}_0 \quad (1)$$

$$Pred'_{01} = ((w_0.Pred_0[x] + w_1.Pred_1[x] + \text{off}_{01}) \gg (\text{shift} + 1) \quad (2)$$

where $off_{01}=(off_0+off_1+1)<<shift$ and $Pred_0$ are uni-directional prediction samples and $Pred_{01}$ are bi-directional prediction samples, located at position x in the current image.

Figure 4:
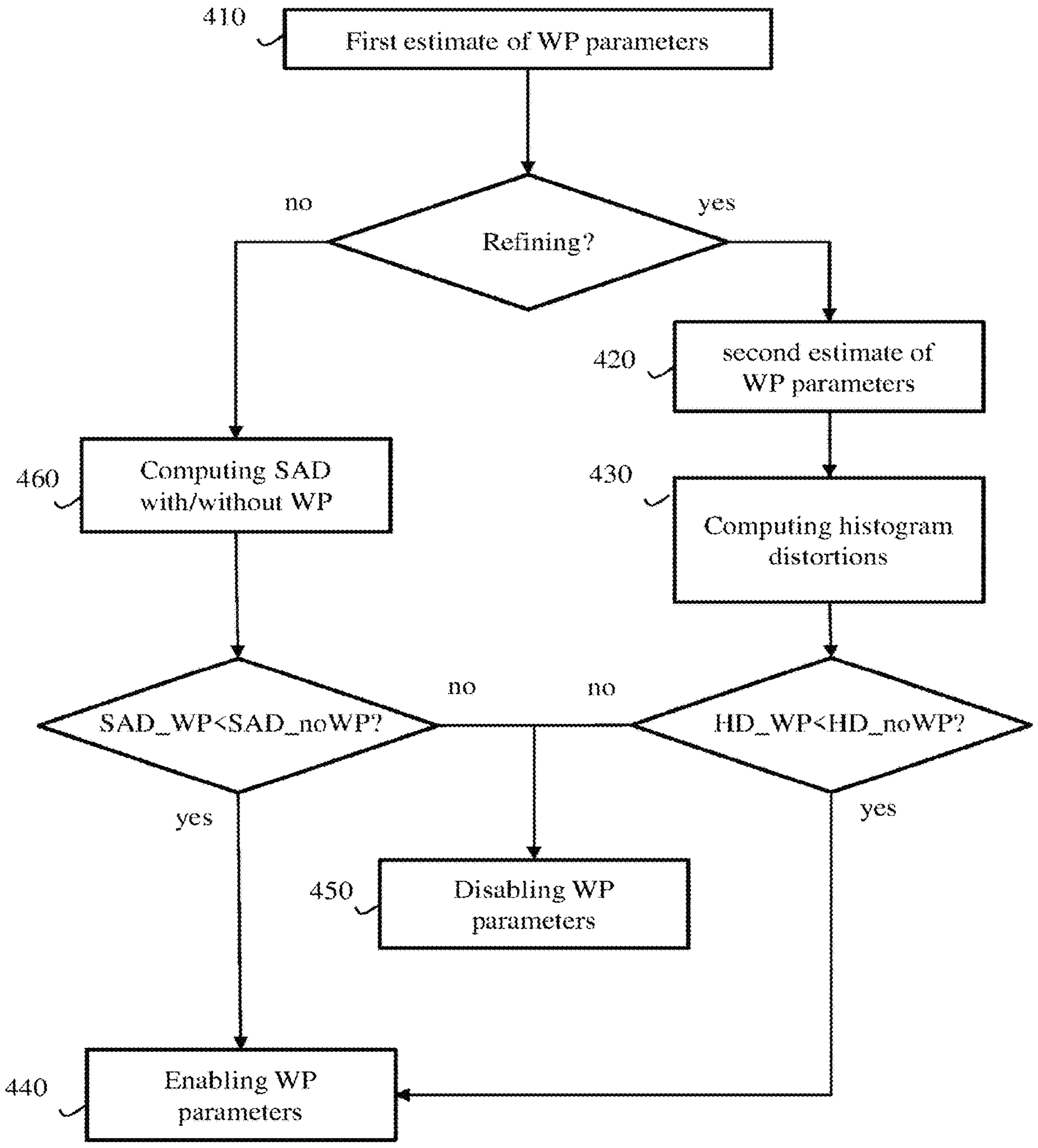
FIG. 4 illustrates a flowchart of a method for estimating weighted prediction parameters in accordance with at least one embodiment.

FIG. 4 illustrates a flowchart of a method for estimating weighted prediction parameters in accordance with at least one embodiment.

In step 410, a first estimate of WP parameters is obtained.

In one embodiment of step 410, the first estimate of WP parameters is obtained from default parameters, possibly received or stored (weight may equal 1 and offset may equal 0).

In one embodiment of step 410, a first estimate of WP parameters is obtained on the base of samples of the image cur and (possibly co-located) samples of the reference image ref.

In one embodiment of step 410, the first estimate of WP parameters is obtained on the base of an average samples value ($DC_{cur}$, $DC_{ref}$) and an average standard deviation or an average of absolute differences ($AC_{cur}$, $AC_{ref}$) computed respectively for the image cur and the reference image ref.

The WP parameters weight and offset may then be derived as follows:

$$\text{weight} = AC_{cur}/AC_{ref}$$

$$\text{offset} = DC_{cur} - \text{weight} \times DC_{ref}$$

For example, an average sample value $DC_{cur}$ for the component "C" of the image "cur" is given by:

$$DC(cur) = \sum_{x \in cur} cur(x)$$

where "cur(x)" is the sample value at position "x" in the image "cur" for the component "C".

For example, an average of absolute differences value $AC_{cur}$ is given by:

$$AC(cur) = \sum_{x \in cur} |cur(x) - DC(cur)|$$

In step 420, a second estimate of the WP parameters based on a scaled reference image histogram $$H'_{scaled},$$

derived from (possibly co-located) samples of the reference image ref, the samples of the current image cur and the first estimate of WP parameters.

Figure 5:
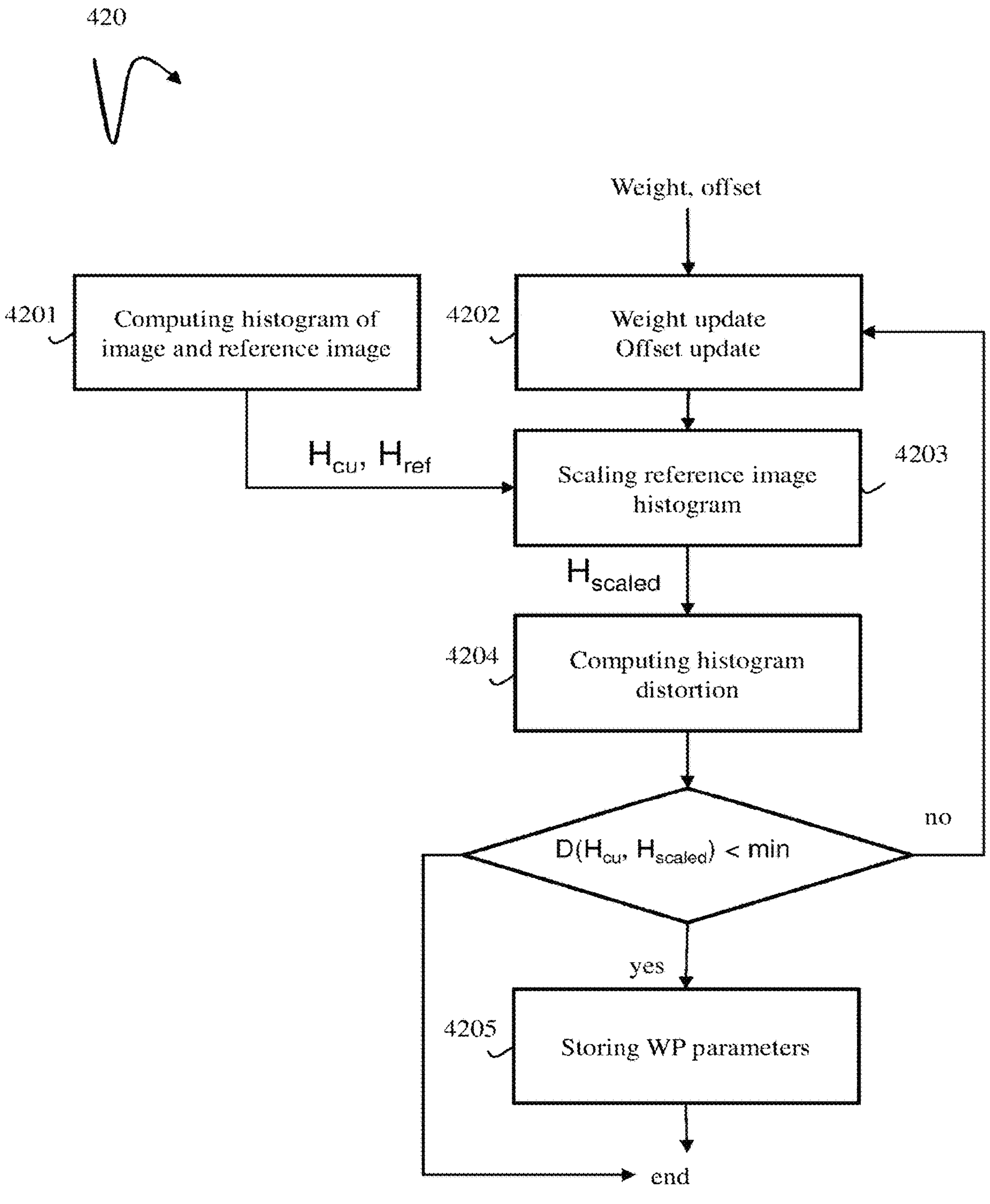
FIG. 5 illustrates a flowchart of step 420 in accordance with at least one embodiment.

FIG. 5 illustrates a flowchart of step 420 in accordance with at least one embodiment.

In step 4201, an image histogram $H_{cur}$ of samples of the image cur and a reference image histogram $H_{ref}$ of (possibly co-located) samples of the reference image ref are computed.

In step 4202, current WP parameters (weight; offset) are derived from previous WP parameter values, for example by adding a given value to previous weight and offset values.

In step 4203, the scaled reference image histogram $H_{scaled}$ is derived from the reference image histogram $H_{ref}$ and the current WP parameters (weight; offset) as follows:

$$j = \text{weight} * i + \text{offset}$$

$$H_{scaled}[\text{weight} * i + \text{offset}] += H_{ref}[i]$$

with i is a bin of $H_{ref}$

In step 4204, an histogram distortion D ($H_{cur}$, $H_{scaled}$) is calculated between the image histogram $H_{cur}$ and the scaled reference image histogram $H_{scaled}$.

The current WP parameters are stored (selected) when D($H_{cur}$, $H_{scaled}$)<min (value of the histogram distortion associated with previously stored WP parameters). Otherwise, new current WP parameters are considered in step 4202 and steps 4203 to 4204 (4205) iterate.

Back to FIG. 4, in step 430, an histogram distortion "HD_noWP"=D($H_{cur}$, $H_{ref}$) is calculated between the image histogram $H_{cur}$ and the reference image histogram Href. Another histogram distortion $$\text{"HD\_WP"} = D(H_{cur}, H'_{scaled})$$

is calculated between the image histogram $H_{cur}$ and a scaled reference image histogram $$H'_{scaled}$$

derived from step 4203 when stored WP parameters are used.

Then, the second estimate of WP parameters is used (enable) for predicting the image blocks (40) when $$D(H_{curr}, H'_{scaled}) < D(H_{curr}, H_{ref}).$$

Otherwise $$(D(H_{curr}, H'_{scaled}) >= D(H_{curr}, H_{ref}),$$

the second estimate of WP parameters is disable (not used for predicting the image blocks) (450).

In variant, an information indicates if the first estimate of the weighted parameters is refined (steps 420, 430 followed by step 440 or 450) or not (step 460 followed by step 440 or 450).

In a variant, when the first estimate of WP parameters is obtained from default parameters (weight may equal 1 and offset may equal 0) then step 410 is followed by steps (steps 420, 430 followed by step 440 or 450).

In a variant, this information may be a configuration parameter of the encoder.

In a variant, the information relates to a component of an image. Then, steps 420 and 430 may run for a component of a picture and step 460 for another component of said picture.

In a variant, a same information is used for all the components of an image. Then, either steps 420 and 430 may run for those components or step 460.

In step 460, a sum of absolute differences (SAD_WP) is calculated between the samples of the image cur and the (possibly co-located) samples of the scaled reference image.

$$\text{SAD\_WP}(w, o) = \sum_{x \in cur} |cur(x) - w.ref(x) - o|$$

Another sum of absolute difference (SAD_noWP) is calculated between the samples of the image cur and the (possibly co-located) samples of the reference image ref.

$$\text{SAD\_noWP} = \sum_{x \in cur} |cur(x) - ref(x)|$$

Then, the first estimate of WP parameters is used (enable) for predicting the image blocks (440) when SAD_WP<SAD_noWP. Otherwise (SAD_WP>=SAD_noWP), the first estimate of WP parameters is disable (not used for predicting the image blocks) (450).

The use of SAD to enable or disable the use WP parameters for predicting image blocks assumes the video sequence comprises few motion, since SAD measures the difference between (possibly co-located or globally motion compensated) samples in the image and the reference image. However, in case of video with sequence with moving objects, the validity of SAD decreases significantly. This issue may be solved by using histogram-based distortions (steps 430) to take better decisions of enabling or disabling estimated WP parameters for predicting image blocks.

In a variant, the method may comprise increasing the bit-depth of samples of the image blocks to be predicted. Internal samples with increased bit-depth compared to the bit-depth of samples of the image blocks are then obtained and stored. This bit-depth increasing increases numerical precision in sample-based prediction processes.

For example, 8-bits samples of image may be increased to 10-bits internal samples.

Figure 6:
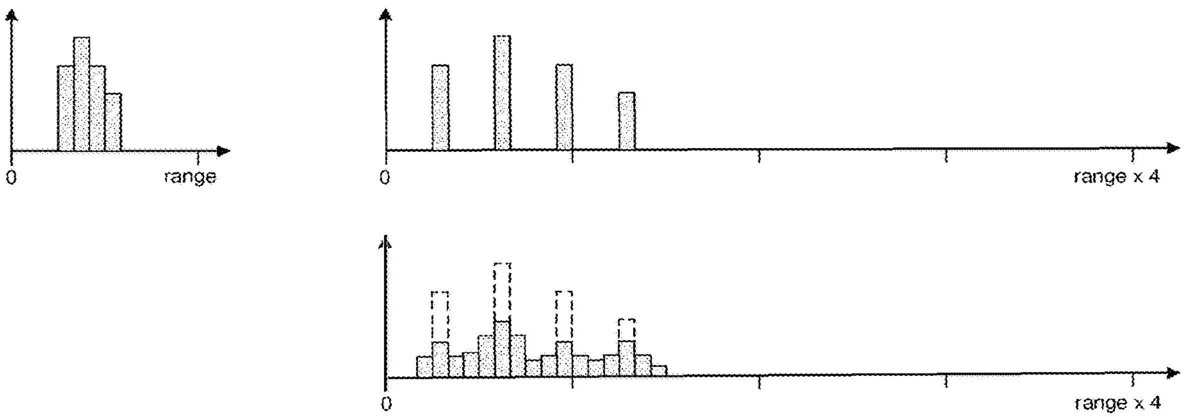
FIG. 6 illustrates a typical example showing how bit-depth increase of 8-bits to 10 bits pictures impacts histograms.

The image histogram and reference image histogram may be highly impacted by the bit-depth increase as illustrated in FIG. 6.

The top of FIG. 6 depicts a typical example showing how bit-depth increase of 8-bits to 10 bits pictures impacts histograms. The top-left histogram represents part of a 8-bits image histogram, and the top-right is the 10-bits (left shifted by 2 bits) image histogram. One can see the bit-depth increase generates empty histogram values for some bins. However, the lossy coding algorithms will not reconstruct exactly the same sample values and the histogram of the reconstructed sample values may look very differently as illustrated in the bottom of FIG. 6.

To solve this issue, in a variant, the method comprises spreading the image histogram $H_{cur}$ when the bit-depth of the image cur (input-bit-depth) is inferior to another given bit-depth (given-bit-depth) such as the bit-depth of the internal samples or the bit-depth of a reconstructed image.

After bit-depth increase, the histogram of the image cur is made of isolated "peaks", separated with empty bins, spaced at regular interval.

For example, the smoothing process can be carried out by distributing histogram peak values N(k) around said "isolated" peak located at every k×(1<<db) positions, with: db=given-bit-depth−input-bit-depth.

Figure 7:
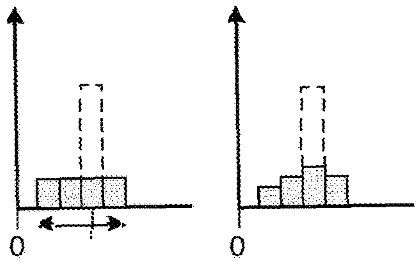
FIG. 7 illustrate an example of histogram spreading in accordance with at least one embodiment.

The distribution (spreading) of the values can be made equally as depicted in FIG. 7—left, or un-equally FIG. 7—right.

The sum of histogram values in the spreading window remains constant equal to N(k) before and after spreading.

In the example of FIG. 7, the dashed histogram is the image histogram after bit-depth increase, and the full-line is the spread image histogram. The spreading window size is (1<<db)=4 if" internal-bit-depth "=10-bits and "input-bit-depth"=8-bits typically.

In case of un-equal spreading, one can use gaussian weights centered at the 'isolated" peak location, as depicted in FIG. 7—right to mimic the plausible/probable distribution of the samples errors after coding.

Various implementations involve decoding. "Decoding", as used in this application, can encompass all or part of the processes performed, for example, on a received encoded sequence in order to produce a final output suitable for display.

In various embodiments, such processes include one or more of the processes typically performed by a decoder, for example, entropy decoding, inverse quantization, inverse transformation, and differential decoding.

In various embodiments, such processes also, or alternatively, include processes performed by a decoder of various implementations described in this application, for example, receiving an information INF; deriving a combined inter-intra prediction block from an inter prediction block and an intra prediction block based on an affine transform for the current image block; and decoding the image block using the determined combined inter-intra prediction.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding.

In an analogous way to the above discussion about "decoding", "encoding" as used in this application can encompass all or part of the processes performed, for example, on an input video sequence in order to produce an encoded bitstream.

In various embodiments, such processes include one or more of the processes typically performed by an encoder, for example, partitioning, differential encoding, transformation, quantization, and entropy encoding.

In various embodiments, such processes also, or alternatively, include processes performed by an encoder of various implementations described in this application, for example, determining an intra prediction for the current image block using a neural network applied to a context surrounding the current image block; encoding the current image block based on the intra prediction; and transmitting the encoded current image block.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization.

In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion. However, according to at least one embodiment, the rate distortion optimization in the encoding is removed as the deep intra prediction mode is the only available mode for intra prediction.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program).

An apparatus can be implemented in, for example, appropriate hardware, software, and firmware.

The methods can be implemented in, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment.

Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for deep intra prediction.

In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types.

The invention claimed is:

1. A method, comprising:

predicting a component of an image block of a video from a set of options that includes a first version of weighted prediction parameters, a refined version of the weighted prediction parameters, or no weighted prediction parameters;

selecting for the component of the image block between using the refined version of the weighted prediction parameters or no weighted prediction parameters based on histogram distortions, wherein the selecting comprises obtaining a first histogram distortion between an image histogram, derived from samples of the image, and a reference image histogram, derived from samples of a reference image, and obtaining a second histogram distortion between the image histogram and a scaled reference image histogram derived from the reference image histogram and the refined version of the weighted prediction parameters; and encoding the image block.

2. The method of claim 1, further comprising spreading the image histogram.

3. The method of claim 2, wherein spreading the image histogram depends on a bit-depth of samples of the image and a given bit-depth.

4. The method of claim 2, wherein spreading the image histogram comprises distributing the samples of the image relative to a peak of the image histogram around the peak.

5. The method of claim 1, further comprising selecting for the component of the image block between using the first version of the weighted prediction parameters or no weighted prediction parameters based on a sum of absolute differences.

6. The method of claim 5, wherein selecting for the component of the image block between using the first version of the weighted prediction parameters or no weighted prediction parameters based on a sum of absolute differences comprises obtaining a sum of absolute differences between samples of the image and samples of a scaled reference image, and obtaining a sum of absolute differences between samples of the image and samples of the reference image.

7. The method of claim 1, further comprising determining whether or not a refining of the first version of weighted prediction parameters is done to obtain the refined version of the weighted prediction parameters.

8. The method of claim 7, wherein the determining is based on a configuration parameter of an encoder.

9. The method of claim 7, wherein when the first version of the weighted prediction parameters is obtained from default weighted prediction parameters, it is determined that the first version of weighted prediction parameters is refined to obtain the refined version of weighted prediction parameters.

10. The method of claim 1, wherein the first version of the weighted prediction parameters is obtained either from default weighted prediction parameters or based on samples of the image and samples of a reference image.

11. The method of claim 10, wherein obtaining the first version of the weighted prediction parameters based on samples of the image and samples of a reference image comprises:

calculating an average sample value (DCcur) and an average of absolute differences from the average sample value (ACcur) for the image;

calculating an average sample value (DCref) and an average of absolute differences from the average sample value (ACref) for the reference image; and deriving a weight parameter as a ratio of ACcur to ACref, and an offset parameter based on DCcur, DCref, and the weight parameter.

12. The method of claim 1, wherein:

responsive to a determination that the component of the image block is a first component, predicting the component of the image block comprises selecting between the refined version of the weighted prediction parameters or no weighted prediction parameters based on histogram distortions; and responsive to a determination that the component of the image block is a second component distinct from the first component, predicting the component of the image block comprises selecting between the first version of the weighted prediction parameters or no weighted prediction parameters based on a sum of absolute differences.

13. The method of claim 1, wherein the refined version of the weighted prediction parameters is obtained based on a scaled reference image histogram derived from samples of a reference image, samples of the image and the first version of the weighted prediction parameters.

14. The method of claim 1, wherein the histogram distortions are calculated as a sum of absolute differences of histogram values for corresponding bins of histograms being compared or as a sum of squared differences of the histogram values for corresponding bins.

15. An apparatus, comprising one or more processors configured to:

predict a component of an image block of a video from a set of options that includes a first version of weighted prediction parameters, a refined version of the weighted prediction parameters or no weighted prediction parameters;

select for the component of the image block between using the refined version of the weighted prediction parameters or no weighted prediction parameters based on histogram distortions, wherein the selection comprises obtaining a first histogram distortion between an image histogram, derived from samples of the image, and a reference image histogram, derived from samples of a reference image, and obtaining a second histogram distortion between the image histogram and a scaled reference image histogram derived from the reference image histogram and the refined version of the weighted prediction parameters; and encode the image block.

16. The apparatus of claim 15, wherein:

responsive to a determination that the component of the image block is a first component, predicting the component of the image block comprises selecting between the refined version of the weighted prediction parameters or no weighted prediction parameters based on histogram distortions; and responsive to a determination that the component of the image block is a second component distinct from the first component, predicting the component of the image block comprises selecting between the first version of the weighted prediction parameters or no weighted prediction parameters based on a sum of absolute differences.

17. The apparatus of claim 15, wherein the one or more processors are configured to determine whether or not a refining of the first version of weighted prediction parameters is done to obtain the refined version of the weighted prediction parameters.

18. The apparatus of claim 17, wherein when the first version of the weighted prediction parameters is obtained from default weighted prediction parameters, it is determined that the first version of weighted prediction parameters is refined to obtain the refined version of weighted prediction parameters.

19. The apparatus of claim 15, wherein the histogram distortions are calculated as a sum of absolute differences of histogram values for corresponding bins of histograms being compared or as a sum of squared differences of the histogram values for corresponding bins.

20. A non-transitory computer readable medium having stored instructions which, when executed by one or more processors, cause the one or more processors to:

predict a component of an image block of a video from a set of options that includes a first version of weighted prediction parameters, a refined version of the weighted prediction parameters, or no weighted prediction parameters;

select for the component of the image block between using the refined version of the weighted prediction parameters or no weighted prediction parameters based on histogram distortions, wherein the selection comprises obtaining a first histogram distortion between an image histogram, derived from samples of the image, and a reference image histogram, derived from samples of a reference image, and obtaining a second histogram distortion between the image histogram and a scaled reference image histogram derived from the reference image histogram and the refined version of the weighted prediction parameters; and encode the image block.

* * * * *